United States Patent [19]

Gualtieri et al.

[11] Patent Number: 5,113,472
[45] Date of Patent: May 12, 1992

[54] OPTICAL WAVEGUIDES OF ALUMINUM GARNET

[75] Inventors: Devlin M. Gualtieri; Robert C. Morris, both of Ledgewood, N.J.

[73] Assignee: Allied-Signal Inc., Morris Township, Morris County, N.Y.

[21] Appl. No.: 706,492

[22] Filed: May 28, 1991

[51] Int. Cl.⁵ .................................. G02B 1/37
[52] U.S. Cl. .................... 385/130; 385/141
[58] Field of Search ............ 350/96.10-96.14, 350/96.33-96.34

[56] References Cited

U.S. PATENT DOCUMENTS

| | | | |
|---|---|---|---|
| 3,764,195 | 10/1973 | Blank et al. | 385/130 |
| 4,092,060 | 5/1978 | Nunoshita et al. | 385/7 |
| 4,136,350 | 1/1979 | Tien | 385/1 |
| 4,743,083 | 5/1988 | Schimpe | 385/17 |
| 4,758,092 | 7/1988 | Heinrich et al. | 356/364 |

OTHER PUBLICATIONS

Tien et al., "Optical Waveguides of Single Crystal Garnet Films", Appl. Phys. Lett., 21, (5) pp. 207–209 (1972).

Wolfe et al., "Broadband Magneto Optic Waveguide Isolator", Appl. Phys. Lett. 57, pp. 960–962 (1990).

Chandler et al., "Ion-Implanted Nd:YAG planar Waveguide Laser", Elect. Lett. 25, pp. 985–986 (1989).

Pross et al., "Yttrium Iron Garnet Single Mode Buried Channel Waveguide for Waveguide Isolators", Appl. Phys. Lett. 52, pp. 682–684, (1988).

Wolfe et al., "Etch-Tuned Ridged Waveguide Magneto Optic Isolator", Appl. Phys. Lett. 56, pp. 426–428 (1990).

Primary Examiner—Akm Ullah
Attorney, Agent, or Firm—Gerhard H. Fuchs; Richard C. Stewart

[57] ABSTRACT

Optical waveguides suitable for use in high temperature environments are constructed of a waveguiding body composed of a first crystalline aluminum garnet, which is clad with an epitaxially deposited layer of a second crystalline aluminum garnet. The second crystalline aluminum garnet has a lower refractive index than the first crystalline aluminum garnet.

20 Claims, 1 Drawing Sheet

OPTICAL WAVEGUIDES OF ALUMINUM GARNET

FIELD OF THE INVENTION

This invention provides optical waveguide/structures of crystalline aluminum garnet of a high refractive index which are clad with crystalline aluminum garnet of a lower refractive index. These clad waveguides can be in the form of fibers, slabs, channels, ribs, or any of the typical optical waveguide structures. They are useful at high temperature.

BACKGROUND OF THE INVENTION

Waveguides are structures which are used to conduct electromagnetic radiation from point to point, much as wire conducts electric current. In an optical waveguide, this electromagnetic radiation is light in either a narrow or broad range of wavelengths which may be contained in the visible spectrum, or the invisible spectra such as ultraviolet or infrared.

All forms of optical waveguides have as a waveguiding medium a material of high refractive index imbedded in a medium of lower refractive index. As an example, a glass fiber of refractive index 1.45, suspended in a vacuum or air of refractive index 1.0, will act as an optical waveguide. More usually, such waveguides are clad with a material, necessarily of lower refractive index, to protect them from ambient conditions. Foreign material in contact with an unclad waveguide will reduce its transmission efficiency by scatter of the waveguided light out of the waveguiding medium, and thus the need for cladding. An example of a clad waveguide is a germania ($GeO_2$) - doped silica ($SiO_2$) glass fiber coated with a layer of silica glass ($SiO_2$) for which there is a 1% difference in refractive index between the core and cladding.

High temperature waveguides are commonly made of sapphire, a crystal form of the high melting point oxide $Al_2O_3$ (melting point 2054° C.). Optical waveguides of sapphire have significant optical loss due to the lack of a suitable cladding material. A metal overcoat is used to protect such waveguides from the environment, but the transmission efficiency of this structure is low. A low loss optical waveguide requires a higher refractive index core surrounded by a lower refractive index cladding, and this is not provided in the metal-clad sapphire core waveguides.

P. J. Chandler et al. [P. J. Chandler et al., Electron. Lett. 25, 985 (1989)] have used an ion-implantation technique to produce a slab waveguide in the aluminum garnet $(Y,Nd)_3Al_5O_{12}$. This ion-implantation technique, unlike the technique of the present invention, makes use of the displacement of atoms in the crystal from their usual positions in the crystal lattice to generate regions of a small refractive index change. This ion-implantation technique is not suitable for use in high temperature waveguides, since the crystal structure will relax to its equilibrium state after exposure to high temperature.

It is an object of the present invention to provide high temperature waveguides having a lower refractive index cladding.

SUMMARY OF THE INVENTION

This invention provides optical waveguide structures of crystalline aluminum garnet of a high refractive index which are clad with an epitaxial layer of an aluminum garnet having a lower refractive index.

Suitably, the aluminum garnets for the higher refractive index body of the waveguide and for the epitaxial cladding layer are selected from aluminum garnets of the composition

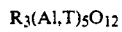

$$R_3(Al,T)_5O_{12}$$

wherein
R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;
with the provisos that
(1) the molar ratio of the combined concentration of indium plus scandium to aluminum does not exceed 2:3; and that
(2) if R is one or more of $Na^{+1}$, $Ca^{+2}$, $Mg^{+2}$ or $Sr^{+2}$, then T must include one or more charge-compensating ions selected from the group consisting of $Fe^{+4}$, $Ge^{+4}$, $Hf^{+4}$, $Ir^{+4}$, $Mo^{+4}$, $Nb^{+4}$, $Os^{+4}$, $Pb^{+4}$, $Pt^{+4}$, $Re^{+4}$, $Rh^{+4}$, $Ru^{+4}$, $Si^{+4}$, $Sn^{+4}$, $Ta^{+4}$, $Ti^{+4}$, $Zr^{+4}$, $V^{+4}$, $W^{+4}$, $As^{+5}$, $Mo^{+5}$, $Nb^{+5}$, $Re^{+5}$, $Sb^{+5}$, $Ta^{+5}$, $U^{+5}$, $V^{+5}$, $Mo^{+6}$, $Re^{+6}$, $W^{+6}$, and $Re^{+7}$, in proportions sufficient to achieve an average cation charge of three in the crystal.

More desirably, R represents one or more of the elements selected from the group consisting of calcium, magnesium, yttrium, lanthanum, praseodymium, neodymium, samarium, europium, gadolinium, terbium, dysprosium, holmium, erbium, thulium, ytterbium and lutetium, and if R is one or both of $Ca^{+2}$ and $Mg^{+2}$, then T should include one or both of $Ge^{+4}$ and $Si^{+4}$ in equimolar concentration relative to the $Ca^{+2}$ and/or $Mg^{+2}$ to achieve an average cation charge of three in the crystal.

An especially suitable aluminum garnet for the cladding layer is yttrium aluminum garnet, $Y_3Al_5O_{12}$ or "YAG"

The R and T elements in the aluminum garnet for the waveguide body and for the cladding layer, and their proportions, are selected to give as large as possible a refractive index difference while still maintaining lattice constant matching. In the event YAG is chosen for the epitaxial cladding layer, then the aluminum garnet compositions of the types $(Y,Lu)_3(Al,In)_5O_{12}$, $(Y,Lu)_3(Al,Sc)_5O_{12}$, $(Tb,Lu)_3Al_5O_{12}$ and $Ho_3Al_5O_{12}$ have been found to meet the criteria of large difference in refractive indexes and lattice matching particularly well.

BRIEF DESCRIPTION OF THE DRAWINGS

In the annexed drawings.

Figure 1:
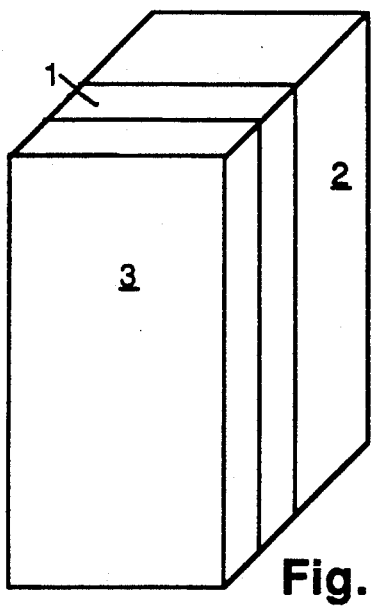
FIG. 1 illustrates a layer (1) of an aluminum garnet of high refractive index and lattice constant match to YAG epitaxially deposited on a YAG substrate (2) and then epitaxially overcoated with an epitaxial YAG layer (3) to form a "sandwich" structure in which the high refractive index waveguiding layer is clad with the lower refractive index cladding layer in a "slab" waveguide geometry.

DETAILED DESCRIPTION OF THE INVENTION, OF THE PREFERRED EMBODIMENTS, AND OF THE BEST MODE PRESENTLY CONTEMPLATED FOR ITS PRACTICE

Garnets are oxides of the general composition $R_3T_5O_{12}$, wherein R and T respectively represent elements which form large and small ions of positive charge (cations). Garnets are resistant to chemical attack and high temperatures. There is much diversity in garnet composition, since R and T can be combinations of one or several elements cohabiting a crystal sublattice, and R and T range over much of the Periodic Table.

Aluminum garnets, $R_3Al_5O_{12}$, are mechanically strong and highly resistant to chemical attack. They are high temperature materials. As mentioned above, yttrium aluminum garnet (YAG) has a melting point of 1947° C. Other properties of YAG, which is a representative aluminum garnet, are a density of 4.55 g/cc, a hardness of 8.5 moh, a thermal conductivity at 300K of 0.13 W/cm/K, and a refractive index of 1.84 at 550 nm.

The aluminum garnets are optically transparent to long wavelengths. YAG is used as a host crystal for lasing ions, Nd:YAG being the prime example with laser emission at the infrared wavelength of 1.06 μm. The melting point of the aluminum garnets is nearly the same as that of sapphire. One advantage that the aluminum garnets have over sapphire in high temperature waveguide applications is that the infrared absorption edge of the former extends to longer wavelengths, allowing efficient use of these waveguides at longer wavelengths of light. Another advantage of the aluminum garnets is the mature state of the art of their epitaxial growth. The epitaxial crystal growth process allows deposition of garnet layers on garnet substrates. Waveguiding and cladding layers can be deposited by the epitaxial crystal growth process, allowing fabrication of clad aluminum garnet optical waveguides.

The common technique for the epitaxial crystal growth of garnet is the liquid phase epitaxy technique, more specifically the horizontal dipping technique with rotation, as developed by H. J. Levinstein et al., (Appl. Phys. Lett. 19, 486 (1971)). This liquid phase epitaxy technique was developed to a high state of the art in research on magnetic bubble memory materials. Magnetic bubble memory devices utilize epitaxial layers of rare earth iron garnet on gadolinium gallium garnet (GGG) substrates. Such layers must be nearly defect-free for proper device operation.

The growth of an epitaxial garnet layer by liquid phase epitaxy proceeds as follows. A garnet substrate is carefully cleaned and mounted in a substrate holder which allows horizontal rotation and vertical translation. The substrate is then "dipped" by vertical translation into a tube furnace containing a platinum crucible holding the molten constituent oxides of the garnet which is to be epitaxially deposited. These oxides are dissolved in a suitable melt solvent, usually a lead oxide based solvent first heated to 1000° C. and then supercooled to about 20° C. below the temperature at which garnet crystals will grow (the saturation temperature).

The substrate submerged in the growth solution is rotated at about 100-250 rev/min, and a garnet layer is epitaxially grown on the substrate at a rate of about 0.5-1.0 μm/min. After time sufficient for growth of the desired layer thickness, the substrate is pulled vertically from the growth solution, and the clinging solution is "spun-off" at high speed. The substrate, now with an epitaxial layer, is removed from the furnace, and remaining traces of solidified growth solution are removed by treatment with a suitable solvent, usually hot nitric acid.

Substitutions of elements in YAG can greatly increase the refractive index. Substitution of some of the aluminum by scandium to form yttrium scandium aluminum garnet ($Y_3Sc_2Al_3O_{12}$ or "YSAG") increases the refractive index from 1.84 to 1.88 at visible wavelengths. A simultaneous replacement of yttrium by gadolinium and aluminum by scandium to form another aluminum garnet, gadolinium scandium aluminum garnet ($Gd_3Sc_2Al_3O_{12}$ or "GSAG"), gives a refractive index of 1.97 at visible wavelengths.

Fabrication of high temperature optical waveguides in accordance with the present invention involves cladding an aluminum garnet substrate of waveguiding structure with an epitaxial aluminum garnet layer having a lower refractive index than the substrate. The body of the optical waveguide within which the light is transmitted is always formed of a single crystal. Optical waveguiding structures of aluminum garnet can be fabricated in a variety of forms, such as fibers, slabs, channels, or ribs. For example, with reference to FIG. 1, an epitaxial layer 1 of an aluminum garnet of high refractive index and lattice constant match to YAG can be epitaxially deposited on a YAG substrate 2 and then epitaxially overcoated with a further epitaxial YAG layer 3 to form a "sandwich" structure in which the high refractive index waveguiding layer 1 is clad with the lower refractive index cladding layers 2 and 3 in a "slab" waveguide geometry.

Figure 2:
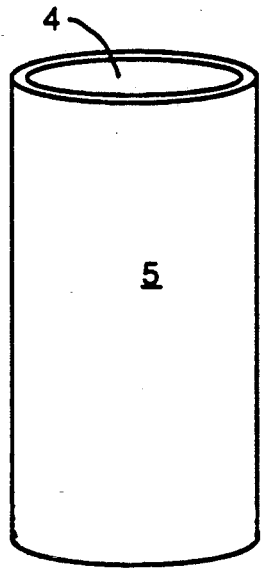
FIG. 2 illustrates an aluminum garnet fiber (4) epitaxially coated with a YAG layer (5) to form a waveguiding fiber.

Similarly, as illustrated in FIG. 2, a fiber 21 of a single crystal higher refractive index aluminum garnet can be epitaxially coated with a layer 22 of a lower refractive index aluminum garnet composition, such as YAG, to form a waveguiding fiber.

Figure 3:
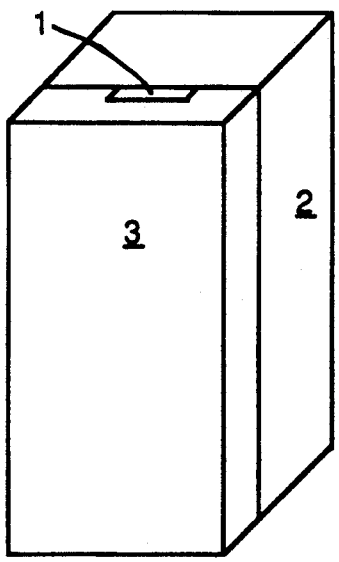
FIG. 3 illustrates a rib waveguide produced by an epitaxial process as the slab guide of FIG. 1, except that the waveguiding layer is patterned into a "rib" before cladding (reference numerals as in FIG. 1)

A rib waveguide as illustrated by FIG. 3 can be produced by the same epitaxial process as for a slab, as illustrated by FIG. 1, except that the higher refractive index waveguiding layer 31 (which has been epitaxially deposited on lower refractive index substrate 32) is patterned into a "rib" before it is epitaxially clad with lower refractive index layer 33. Such "rib" waveguides have been produced in iron garnets by Pross et al. [E. Pross et al., Appl. Phys. Lett. 52, 682 (1988)]. Similar waveguides in iron garnet have been reported by R. Wolfe et al. [R. Wolfe et al., J. Appl. Phys. 56, 426 (1990); J. Appl. Phys. 57, 960 (1990)]. The difference in refractive index between waveguiding and cladding layers in the reported iron garnet waveguides is about 0.3%.

Figure 4:
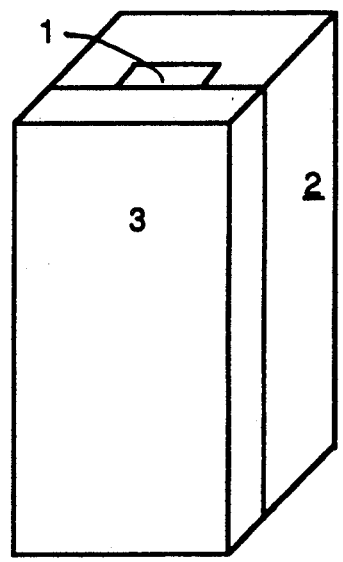
FIG. 4 illustrates a channel waveguide formed as a variation of a rib waveguide in which the guiding material is deposited in a channel in the substrate layer before cladding (reference numerals as in FIG. 1).

A channel waveguide as illustrated by FIG. 4 is a variation of a rib waveguide in which the guiding aluminum garnet crystal 41 is deposited in a channel in the substrate 42, and then clad with a further layer 43.

Optical waveguides of aluminum garnet, as provided by this invention, are most conveniently prepared by the liquid phase epitaxy crystal growth technique. The growth of an aluminum garnet crystal layer by liquid phase epitaxy on an aluminum garnet substrate, for example, a wafer of YAG, proceeds as follows: A substrate crystal of YAG, or YAG with a previous overgrowth of a garnet crystal, is carefully cleaned and mounted in a substrate holder which allows horizontal rotation and vertical translation. The substrate is then "dipped" by vertical translation into a tube furnace containing a platinum crucible holding the molten constituent oxides of the aluminum garnet which is to be grown dissolved in a lead oxide based solvent, or other suitable solvent as is known in common crystal growth practice. In the case of a lead oxide based solvent, this mixture (termed a "melt") is first heated to about 1150° C. for a period of about eight hours, to homogenize the components, and then supercooled to about 20° C. below the temperature at which garnet crystals will grow (the saturation temperature).

After the substrate is dipped into the growth solution, it is rotated at about 100–250 rev/min, and an aluminum garnet layer is epitaxially grown on the substrate at a rate of about 0.5–2.5 μm/min. After time sufficient for growth of the desired layer thickness, the substrate is pulled vertically from the growth solution, and the clinging solution is "spun-off" by rotation at high speed. The substrate, now with an epitaxial layer, is removed from the furnace, and remaining traces of solidified growth solution are removed in hot nitric acid. As this epitaxial crystal growth technique is in common and widespread use, the distinguishing features of this invention are the compositions of the epitaxial crystals and the compositions of the melts from which they are grown.

Purity of starting materials is important, since many impurity components will cause optical absorption in the waveguides and reduce the transmission efficiency. For example, holmium, a rare-earth impurity, absorbs strongly at the wavelength of a red helium-neon gas laser, 632.8 nm. The rare earths are chemically similar and difficult to separate, so that such impurity absorption is a common problem. In general, the purity of the rare earth components of a melt should be at least 99.9%, and the purity of the lead oxide solvent should be at least 99.999%.

The difference in refractive index between the higher refractive index aluminum garnet single crystal waveguiding body and the lower refractive index epitaxial aluminum garnet coating should be at least least about 0.02%, preferably at least about 0.1%, more preferably at least about 0.5%. There is no upper limit on the difference in refractive indices. Any aluminum garnet combination having sufficiently different refractive indices is suitable for present purposes, so long as the lattice constants of these garnets are sufficiently close to permit epitaxial deposition of one on the other. To permit such epitaxial deposition, the lattice mismatch should not be larger than about 1.4%, desirably not larger than about 0.15%. Preferably, it is less than about 0.05%.

The refractive index of aluminum garnet can be predicted to serve as a guide to composition selection for use in the waveguides of the present invention, as described by K. Nassau, Physics Today, September 1984, p. 42 in an article entitled *Dispersion—our current understanding*. Briefly, the refractive index of aluminum garnets is a function of wavelength, and the ultraviolet and infrared absorption bands of the crystal. Knowledge of the absorption parameters (which can be readily determined using conventional procedures) allows calculation of the refractive index for a particular composition at any wavelength by the "Sellmeier" equation. For example, a linear combination of the refractive indices of the terminal aluminum garnet compositions $(R^1)_3(Al,T^1)_5O_{12}$ and $(R^2)_3(Al,T^2)_5O_{12}$ is sufficient to give the refractive index of any intermediate aluminum garnet composition $(R^1,R^2)_3(Al,T^1,T^2)_5O_{12}$.

The lattice constants of the aluminum garnets useful for making the present waveguides are determined using conventional X-ray diffraction procedures, as for example described in W. L. Bond, *Precision Lattice Constant Determination*, Acta Cryst. 13, 814–818 (1960); W. L. Bond, *Precision Lattice Constant Determination: Erratum*, Acta Cryst. A31, 698 (1975); and R. L. Barnes, *A Survey of Precision Lattice Parameter Measurements as a Tool for the Characterization of Single-Crystal Materials*, Mat. Res. Bull. 2, 273–282 (1967).

The Table I below lists illustrative sets of aluminum garnet compositions suitable for making the waveguide structure of the present invention with YAG as a substrate and YAG as an overcoating layer:

TABLE I $Ho_3\ Al_5\ O_{12}$
$Tb_{1.63}\ Lu_{1.37}\ Al_5\ O_{12}$
$Tb_{1.47}\ Yb_{1.53}\ Al_5\ O_{12}$
$Tb_{1.10}\ Tm_{1.90}\ Al_5\ O_{12}$
$Tb_{0.61}\ Er_{2.39}\ Al_5\ O_{12}$
$Dy_{2.09}\ Lu_{0.91}\ Al_5\ O_{12}$
$Dy_{1.95}\ Yb_{1.05}\ Al_5\ O_{12}$
$Dy_{1.59}\ Tm_{1.41}\ Al_5\ O_{12}$
$Dy_{1.00}\ Er_{2.00}\ Al_5\ O_{12}$
$Gd_{1.33}\ Lu_{1.67}\ Al_5\ O_{12}$
$Gd_{1.17}\ Yb_{1.83}\ Al_5\ O_{12}$
$Gd_{0.84}\ Tm_{2.16}\ Al_5\ O_{12}$
$Gd_{0.44}\ Er_{2.56}\ Al_5\ O_{12}$
$Y_{0.78}\ Lu_{2.22}\ Sc_{0.52}\ Al_{4.48}\ O_{12}$
$Y_{0.66}\ Yb_{2.34}\ Sc_{0.44}\ Al_{4.56}\ O_{12}$
$Y_{0.44}\ Tm_{2.56}\ Sc_{0.29}\ Al_{4.71}\ O_{12}$
$Y_{0.21}\ Er_{2.79}\ Sc_{0.14}\ Al_{4.86}\ O_{12}$
$Dy_{0.67}\ Lu_{2.33}\ Sc_{0.45}\ Al_{4.55}\ O_{12}$
$Dy_{0.56}\ Yb_{2.44}\ Sc_{0.38}\ Al_{4.62}\ O_{12}$
$Dy_{0.37}\ Tm_{2.63}\ Sc_{0.25}\ Al_{4.75}\ O_{12}$
$Dy_{0.18}\ Er_{2.82}\ Sc_{0.12}\ Al_{4.88}\ O_{12}$
$Tb_{0.61}\ Lu_{2.39}\ Sc_{0.41}\ Al_{4.59}\ O_{12}$
$Tb_{0.51}\ Tb_{2.49}\ Sc_{0.34}\ Al_{4.66}\ O_{12}$
$Tb_{0.33}\ Tm_{2.67}\ Sc_{0.22}\ Al_{4.78}\ O_{12}$
$Tb_{0.16}\ Er_{2.84}\ Sc_{0.10}\ Al_{4.90}\ O_{12}$
$Gd_{0.55}\ Lu_{2.45}\ Sc_{0.36}\ Al_{4.64}\ O_{12}$
$Gd_{0.46}\ Yb_{2.54}\ Sc_{0.30}\ Al_{4.70}\ O_{12}$
$Gd_{0.29}\ Tm_{2.71}\ Sc_{0.20}\ Al_{4.80}\ O_{12}$
$Gd_{0.14}\ Er_{2.86}\ Sc_{0.09}\ Al_{4.91}\ O_{12}$
$Ca_{1.00}\ Tb_{2.00}\ Si_{1.00}\ Al_{4.00}\ O_{12}$
$Ca_{0.61}\ Dy_{2.39}\ Si_{0.61}\ Al_{4.39}\ O_{12}$
$Ca_{1.28}\ Gd_{1.72}\ Si_{1.28}\ Al_{3.72}\ O_{12}$
$Ca_{1.88}\ Y_{1.12}\ Si_{1.88}\ Sc_{0.75}\ Al_{2.37}\ O_{12}$
$Ca_{2.02}\ Dy_{0.98}\ Si_{2.02}\ Sc_{0.66}\ Al_{2.32}\ O_{12}$
$Ca_{2.10}\ Tb_{0.90}\ Si_{2.10}\ Sc_{0.60}\ Al_{2.30}\ O_{12}$
$Ca_{2.18}\ Gd_{0.82}\ Si_{2.18}\ Sc_{0.55}\ Al_{2.27}\ O_{12}$
$Ca_{1.27}\ Lu_{1.73}\ Ge_{1.27}\ Al_{3.73}\ O_{12}$
$Ca_{1.12}\ Yb_{1.88}\ Ge_{1.12}\ Al_{3.88}\ O_{12}$
$Ca_{0.79}\ Tm_{2.21}\ Ge_{0.79}\ Al_{4.21}\ O_{12}$
$Ca_{0.41}\ Er_{2.59}\ Ge_{0.41}\ Al_{4.59}\ O_{12}$

The required thickness of the guiding layer (the layer in which the light is being propagated) is a function of the relative refractive indices of the guiding layer, the cladding layers, the wavelength of the light to be guided, and the number of modes which are to be transmitted. Procedures for calculating the thickness of the guiding layer based on these parameters are well known to those skilled in the art of optical waveguiding.

As to the thickness of the cladding layer, it can be zero, since waveguiding will still occur under conditions in which the waveguiding layer is exposed to air (refractive index 1), but the thickness of the cladding layer for usual operation is desirably large. Of course, there is no limits to the thickness, other than those dictated by practical considerations of relating to construction, expense of application, etc. In practice the thickness of the cladding layer should be large with respect to the ratio of the wavelength to the refractive index difference between waveguide and cladding layer. It can be made thinner if greater optical loss is tolerable under usual operating conditions at which the waveguide will be exposed to an environment of arbitrary refractive index. In general, the ratio of the thickness of the cladding layer to the ratio of the wavelength to the refractive index difference between waveguide and cladding layer should preferably be greater than 0.01, more preferably greater than 0.1. In practical operation, the thickness of the cladding layer will ordinarily be at least about 3 $\mu$m, more desirably at least about 10 $\mu$m; preferably at least about 25 $\mu$m, and more preferably yet at least about 100 $\mu$m.

The following examples, which should be interpreted as illustrative rather than in a limiting sense, will further explain the present invention.

EXAMPLE 1

A melt was prepared for the epitaxial crystal growth of an aluminum garnet layer of composition $(Y,Lu)_3(Al,In)_5O_{12}$, by melting together the oxides in the following proportions:

| | |
|---|---|
| PbO | 952.87 g; |
| $B_2O_3$ | 24.77 g; |
| $Al_2O_3$ | 8.04 g |
| $In_2O_3$ | 8.75 g |
| $Y_2O_3$ | 2.81 g |
| $Lu_2O_3$ | 3.30 g |

An epitaxial layer of the approximate composition $Y_2Lu_1Al_{4.7}In_{0.3}O_{12}$ was grown by the liquid phase epitaxial crystal growth process detailed above on a substrate wafer of YAG, thereby producing a slab waveguide. Growth conditions and product properties were as follows:

| | |
|---|---|
| growth temperature: | 926.5° C. |
| growth rate: | 1.17 $\mu$m/min |
| thickness: | 2.34 $\mu$m |
| lattice constant (Angs.): | 12.0150 |
| refractive index (at 633 nm) | 1.8424. |

Light from a helium-neon gas laser was guided in this slab waveguide using the conventional prism coupling technique, employing a rutile prism. This waveguiding allowed measurement of the refractive index of the epitaxial layer, as shown above.

EXAMPLES 2-5

Melts were prepared for the epitaxial crystal growth of aluminum garnet layers of composition $(Tb,Lu)_3Al_5O_{12}$, as detailed in Table II, below:

TABLE II

Composition of Melt in Grams for the Growth of Optical Waveguides of Composition $(Tb,Lu)_3Al_5O_{12}$ on YAG Substrates.

| | PbO | $B_2O_3$ | $Al_2O_3$ | $Tb_2O_3$ | $Lu_2O_3$ |
|---|---|---|---|---|---|
| Example 2 | 602.71 | 15.67 | 5.30 | 3.25 | 1.90 |
| Example 3 | 602.71 | 15.67 | 5.99 | 3.85 | 1.97 |
| Example 4 | 602.71 | 15.67 | 5.99 | 3.85 | 1.97 |
| Example 5 | 477.14 | 12.40 | 5.30 | 3.25 | 1.90 |

Epitaxial layers of the approximate composition $Tb_{1.75}Lu_{1.25}Al_5O_{12}$ were grown by the liquid phase epitaxial crystal growth process detailed above on substrate wafers of YAG. Growth conditions and product properties were as described in Table III, below. Light from a helium-neon gas laser was guided in these slab waveguides by the prism coupling technique, using a rutile prism. This waveguiding technique allowed measurement of the refractive index of the epitaxial layers also.

TABLE III

Properties of Slab Waveguides of $(Lu,Tb)_3Al_5O_{12}$ Epitaxially Grown on YAG Substrates.

| Example No.: | 2 | 3 | 4 | 5 |
|---|---|---|---|---|
| Growth Temp (°C.): | 928.0 | 950.5 | 951.5 | 952.0 |
| Growth Rate ($\mu$m/min): | 0.78 | 1.48 | 0.90 | 3.53 |
| Thickness ($\mu$m): | 3.91 | 7.42 | 4.51 | 4.97 |
| Ref. Ind. (at 633 nm): | 1.8535 | 1.8544 | 1.8540 | 1.8547 |
| Lattice Const. (Angs.): | 11.9972 | 12.0073 | — | 12.0126 |

To further illustrate the waveguiding nature of these epitaxial layers, the effective refractive index of several of the guiding modes was measured at the 632.8 nm wavelength of a helium-neon laser. The results are illustrated in Table IV, below. Also shown in Table IV are the calculated refractive indices for these modes, based on an ideal model of a step change of refractive index between the YAG substrate and the waveguiding layer.

TABLE IV

Guided Modes in the Slab Waveguide of $(Tb,Lu)_3Al_5O_{12}$ on YAG, of Example 3, at 632.8 nm.

| Mode Number | Calc. Ref. Index | Measured Ref. Index |
|---|---|---|
| 1 | 1.8539 | — |
| 2 | 1.8524 | 1.8525 |
| 3 | 1.8500 | 1.8501 |
| 4 | 1.8466 | 1.8466 |
| 5 | 1.8422 | 1.8423 |
| 6 | 1.8369 | 1.8370 |
| 7 | 1.8308 | 1.8313 |

Optical transmission loss measurements were made on the $(Lu,Tb)_3Al_5O_{12}$ slab waveguide of Example 4. Light was guided into the epitaxial layer by prism coupling using a rutile prism, and the intensity of scattered light along the waveguiding track was probed with a fiberoptic cable. Measurement of the light intensity along the track as a function of position gives the optical loss directly if reflected light from the edge of the wafer does not follow along the same track. Loss measurements along five different waveguiding tracks in the layer (Table V) gave an optical loss of 1.1±1.2 dB/cm. An optical loss of the order of 1 dB/cm is considered adequate for most applications.

TABLE V

Optical Loss for a Guided Mode in
(Tb,Lu)₃Al₅O₁₂ Layer (Example 4) at 632.8 nm

| Measurement No. | Loss (dB) | Path (cm) | dB/cm |
| --- | --- | --- | --- |
| 1 | 0.6 | 1.0 | 0.6 |
| 2 | 1.4 | 1.2 | 1.2 |
| 3 | 1.1 | 1.2 | 0.9 |
| 4 | 1.1 | 0.6 | 1.8 |
| 5 | 0.5 | 0.5 | 1.0 |

EXAMPLE 6

A melt was prepared for the epitaxial crystal growth of aluminum garnet layers of composition $(Tb,Lu)_3Al_5O_{12}$, by melting together the oxides in the following proportions:

| | |
| --- | --- |
| PbO | 765.12 g; |
| $B_2O_3$ | 19.89 g; |
| $Al_2O_3$ | 7.61 g |
| $Tb_2O_3$ | 4.88 g |
| $Lu_2O_3$ | 2.50 g |

An epitaxial layer of the approximate composition $Tb_{1.75}Lu_{1.25}Al_5O_{12}$ was grown at 958° C. at a growth rate of 1.97 μm/min. by the liquid phase epitaxial crystal growth process detailed above on a substrate wafer of YAG. The thickness of the epitaxial layer was measured to be 9.8 μm. An optical loss measurement at 632.8 nm was performed on this slab waveguide using the dual prism method, wherein light is coupled into the waveguide by a prism made of the high refractive index material rutile, and then extracted from the waveguide by another rutile prism. The distance between prisms fixes the optical path length, and the optical loss is readily calculated from measurement of the intensity of the incident and the recovered light. The optical loss for this waveguide was found to be 1.22 dB/cm.

EXAMPLE 7

A melt was prepared for the epitaxial crystal growth of aluminum garnet layers of composition $(Tb,Lu)_3Al_5O_{12}$, by melting together the oxides in the following proportions:

| | |
| --- | --- |
| PbO | 760.10 g; |
| $B_2O_3$ | 19.76 g; |
| $Al_2O_3$ | 10.24 g |
| $Tb_2O_3$ | 6.96 g |
| $Lu_2O_3$ | 2.94 g |

This melt composition can be described more generally by the following molar ratios of the components:

$Al_2O_3/(Tb_2O_3+Lu_2O_3)=3.8$ $PbO/2B_2O_3=6$ $(Al_2O_3+Tb_2O_3+Lu_2O_3)/(Al_2O_3+Tb_2O_3+Lu_2O_3+B_2O_3+\frac{1}{2}PbO)=0.06$ $Tb_2O_3/(Tb_2O_3+Lu_2O_3)=0.72$ $Lu_2O_3/(Tb_2O_3+Lu_2O_3)=0.28$ This melt has a saturation temperature of about 1070° C. and a growth temperature of about 1055° C. Epitaxial layers of the approximate composition $Tb_{1.75}Lu_{1.25}Al_5O_{12}$ were grown from this melt on YAG substrate wafers to be overcoated with a cladding layer of YAG in order to fabricate clad waveguides of aluminum garnet.

A melt for the liquid phase epitaxy of YAG was formulated with the composition listed below to overcoat the optical waveguiding layer of $(Tb,Lu)_3Al_5O_{12}$ with a cladding layer of YAG.

| | |
| --- | --- |
| PbO | 765.24 g; |
| $B_2O_3$ | 19.89 g; |
| $Al_2O_3$ | 9.40 g |
| $Y_2O_3$ | 5.48 g |

This melt composition can be described more generally by the following molar ratios of the components:

$(Al_2O_3/Y_2O_3)=3.8$ $(PbO/2B_2O_3)=6.0$ $(Al_2O_3+Y_2O_3)/(Al_2O_3+Y_2O_3+B_2O_3+(\frac{1}{2})PbO)=0.055$ This melt produced epitaxial layers of YAG at a growth temperature of about 1095° C. at a growth rate of about 1.5 μm/min. Two (Tb,Lu)-aluminum garnet optical waveguides prepared previously on YAG wafers were epitaxially clad with YAG by this melt. The properties of the finished clad waveguides (Guide A and Guide B) were as follows:

| | Guide A | Guide B |
| --- | --- | --- |
| Guiding Layer: | | |
| layer thickness (μm) | 25.6 | 11.8 |
| growth rate (μm/min) | 1.71 | 2.36 |
| refractive index at 632.8 nm | 1.8545 | 1.8545 |
| Clad Layer | | |
| layer thickness (μm) | 3.26 | 2.83 |
| growth rate (μm/min) | 1.63 | 1.41 |
| refractive index at 632.8 nm | 1.8284 | 1.8288 |

The waveguides of the present invention are particularly suited for controlled transmission of light in high temperature environments, as, for example, for optical engine controls for turbine engines, and the like.

Since various changes may be made in the invention without departing from its spirit and essential characteristics, it is intended that all matter contained in the description shall be interpreted as illustrative only and not in a limiting sense, the scope of the invention being defined by the appended claims.

We claim:

1. An optical waveguide comprising, in combination, a waveguiding body composed of a first crystalline aluminum garnet, and a cladding comprising an epitaxially deposited layer of a second crystalline aluminum garnet, wherein said second crystalline aluminum garnet has a lower refractive index than said first crystalline aluminum garnet, and wherein the aluminum garnets for the higher refractive index body of the waveguide and for the epitaxial cladding layer are selected from aluminum garnets of the composition $R_3(Al,T)_5O_{12}-$ wherein R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that (1) the molar ratio of the combined concentration of indium plus scandium to aluminum does not exceed 2:3; and that (2) if R is one or more of $Na^{+1}$, $Ca^{+2}$, $Mg^{+2}$ or $Sr^{+2}$, then T must include one or more charge-compensating ions selected from the group consisting of $Fe^{+4}$, $Ge^{+4}$, $Hf^{+4}$, $Ir^{+4}$, $Mo^{+4}$, $Nb^{+4}$, $Os^{+4}$, $Pb^{+4}$, $Pt^{+4}$, $Re^{+4}$, $Rh^{+4}$, $Ru^{+4}$, $Si^{+4}$, $Sn^{+4}$, $Ta^{+4}$, $Ti^{+4}$, $Zr^{+4}$, $V^{+4}$, $W^{+4}$, $As^{+5}$, $Mo^{+5}$, $Nb^{+5}$, $Re^{+5}$, $Sb^{+5}$, $Ta^{+5}$, $U^{+5}$, $V^{+5}$, $Mo^{+6}$, $Re^{+6}$, $W^{+6}$, and $Re^{+7}$, in proportions sufficient to achieve an average cation charge of three in the crystal.

2. The optical waveguide of claim 1 wherein the aluminum garnets for the higher refractive index body of the waveguide and for the epitaxial cladding layer are selected from aluminum garnets of the composition $$R_3(Al,T)_5O_{12}$$

wherein

R represents one or more of the elements selected from the group consisting of calcium, magnesium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that (1) the molar ratio of the combined concentration of indum plus scandium to aluminum does not exceed 2:3; and that (2) if R is one or both of $Ca^{+2}$ and $Mg^{+2}$, then T includes one or both of $Ge^{+4}$ and $Si^{+4}$ in equimolar concentration relative to the $Ca^{+2}$ and/or $Mg^{+2}$ to achieve an average cation charge of three in the crystal.

3. The optical waveguide of claim 1 wherein the body of the waveguide is an aluminum garnet selected from the composition $(Y,Lu)_3(Al,In)_5O_{12}$, $(Y,Lu)_3(Al,Sc)_5O_{12}$, $(Tb,Lu)_3Al_5O_{12}$ and $Ho_3Al_5O_{12}$.

4. The optical waveguide of claim 3 wherein the epitaxial cladding layer is yttrium aluminum garnet.

5. The optical waveguide of claim 3 wherein the body of the waveguide has the composition $Y_2Lu_1Al_{4.2}In_{0.3}O_{12}$ and the epitaxial cladding layer is yttrium aluminum garnet.

6. The optical waveguide of claim 3 wherein the body of the waveguide has the composition $Tb_{1.75}Lu_{1.25}Al_5O_{12}$ and the epitaxial cladding layer is yttrium aluminum garnet.

7. The optical waveguide of claim 2 comprising an yttrium aluminum garnet base, having epitaxially deposited thereon an aluminum garnet waveguiding body of the composition $R_3(Al,T)_5O_{12}$ having a higher refractive index than said yttrium aluminum garnet, and having an epitaxial cladding layer of yttrium aluminum garnet on said aluminum garnet of the composition $R_3(Al,T)_5O_{12}$.

8. The optical waveguide of claim 7 wherein said aluminum garnet waveguiding body is in the form of a waveguiding rib.

9. The optical waveguide of claim 8 wherein said waveguiding rib is located within a channel formed in the yttrium aluminum garnet base.

10. The optical waveguide of claim 2 having a waveguiding body in the form of an elongated waveguiding member, having deposited thereon an epitaxial cladding layer of an aluminum garnet having a lower refractive index than said waveguiding body.

11. The optical waveguide of claim 10 wherein said elongated waveguiding member is an optical fiber.

12. The optical waveguide of claim 11 wherein the epitaxial cladding layer is yttrium aluminum garnet.

13. The optical waveguide of claim 12 wherein the optical fiber is an aluminum garnet selected from the composition $(Y,Lu)_3(Al,In)_5O_{12}$, $(Y,Lu)_3(Al,Sc)_5O_{12}$, $(Tb,Lu)_3Al_5O_{12}$ and $Ho_3Al_5O_{12}$.

14. The method for forming an optical waveguide which comprises providing a base of a first aluminum garnet, epitaxially depositing thereon a second aluminum garnet having a higher refractive index than said first aluminum garnet, and epitaxially depositing on said second aluminum garnet a third aluminum garnet cladding layer having a lower refractive index than said second aluminum garnet, wherein said aluminum garnets for said body of the waveguide and for said epitaxial cladding layers are selected from aluminum garnets of the composition $$R_3(Al,T)_5O_{12}-$$

wherein

R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

15. The method of claim 14 wherein said first and said third aluminum garnet have the same composition.

16. The method of claim 15 wherein said first and said third aluminum garnet are both yttrium aluminum garnet.

17. The method of claim 16 wherein said second aluminum garnet is selected from the composition $(Y,Lu)_3(Al,In)_5O_{12}$, $(Y,Lu)_3(Al,Sc)_5O_{12}$, $(Tb,Lu)_3Al_5O_{12}$ and $Ho_3Al_5O_{12}$.

18. The method for making an elongated optical waveguide which comprises forming an elongated waveguiding body of a first aluminum garnet, and epitaxially depositing thereon a second aluminum garnet having a lower refractive index than said first aluminum garnet, wherein said aluminum garnets for the higher refractive index body of the waveguide and for the epitaxial cladding layer are selected from aluminum garnets of the composition $$R_3(Al,T)_5O_{12}-$$

wherein

R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that (1) the molar ratio of the combined concentration of indium plus scandium to aluminum does not exceed 2:3; and that (2) if R is one or more of $Na^{+1}$, $Ca^{+2}$, $Mg^{+2}$ or $Sr^{+2}$, then T must include one or more charge-compensating ions selected from the group consisting of $Fe^{+4}$, $Ge^{+4}$, $Hf^{+4}$, $Ir^{+4}$, $Mo^{+4}$, $Nb^{+4}$, $Os^{+4}$, $Pb^{+4}$, $Pt^{+4}$, $Re^{+4}$, $Rh^{+4}$, $Ru^{+4}$, $Si^{+4}$, $Sn^{+4}$, $Ta^{+4}$, $Ti^{+4}$, $Zr^{+4}$, $V^{+4}$, $W^{+4}$, $As^{+5}$, $Mo^{+5}$, $Nb^{+5}$, $Re^{+5}$, $Sb^{+5}$, $Ta^{+5}$, $U^{+5}$, $V^{+5}$, $Mo^{+6}$, $Re^{+6}$, $W^{+6}$, and $Re^{+7}$, in proportions sufficient to achieve an average cation charge of three in the crystal.

19. The method of claim 18 wherein said elongated waveguiding body is an optical fiber, and said second aluminum garnet is yttrium aluminum garnet.

20. The method of claim 19 wherein said optical fiber is an aluminum garnet having a composition selected from the group consisting of $(Y,Lu)_3(Al, In)_5O_{12}$, $(Y,Lu)_3(Al, Sc)_5O_{12}$, $(Tb,Lu)_3Al_5O_{12}$ and $Ho_3Al_5O_{12}$.

* * * * *